United States Patent Office 3,283,035
Patented Nov. 1, 1966

3,283,035
HIGH IMPACT STRENGTH VINYL CHLORIDE POLYMER COMPOSITIONS CONTAINING AN ETHYLENE-VINYL ALKANOATE COPOLYMER AND A CHLORINATED POLYOLEFIN
David F. Schnebelen, Jr., Plaquemine, La., assignor to The Dow Chemical Company, Midland, Mich., a corporation of Delaware
No Drawing. Filed June 17, 1964, Ser. No. 375,940
10 Claims. (Cl. 260—897)

The present invention relates to rigid, high impact strength vinyl chloride resin compositions having improved physical properties and processing characteristics. More particularly, this invention is concerned with novel, high impact strength vinyl chloride resin compositions, and articles prepared therefrom, containing relatively small but highly effective amounts of an ethylene-vinyl alkanoate copolymer and a chlorinated polyolefin.

It is known that the impact strength of vinyl chloride resins can be appreciably enhanced by blending the same with certain ethylene-vinyl alkanoate copolymers (as described by the U.S. Patent No. 3,125,545, issued March 17, 1964) or by the addition of certain chlorinated polyolefins (as described by the U.S. Patent No. 3,006,889, issued October 31, 1961). These prior known compositions, however, often require excessive (and costly) amounts of such modifying materials for obtainment of the required degree of impact strength. Further, the resistance to impact of such prior known compositions has been found to be significantly reduced by the preparation of shaped articles therefrom while utilizing conventional vinyl chloride polymer fabrication temperatures and techniques.

Accordingly, it is an object of the present invention to provide rigid vinyl chloride polymer compositions of high impact strength.

It is another object to provide such vinyl chloride polymer compositions which are easily fabricated into shaped articles, using conventionally employed temperatures and techniques without reduction in impact strength.

Other and related objects will be apparent from the following specification and claims.

In accordance with the present invention there is provided a rigid, thermoplastic resinous composition comprising an intimate admixture of (1) a vinyl chloride polymer containing at least about 80 percent by weight of polymerized vinyl chloride in the polymer molecule, as hereinafter defined, (2) up to about 40 and advantageously from about 2 to 40 and preferably from about 3 to 8 parts by weight, per 100 parts of vinyl chloride polymer, of an ethylene-vinyl alkanoate copolymer containing from about 2 to 65 percent by weight of the vinyl alkanoate component, and (3) from about 1 to 20 and preferably from about 3 to 10 parts by weight per 100 parts of vinyl chloride polymer of a chlorinated polyolefin.

The vinyl chloride polymers included in the polymer blends may be any rigid or essentially rigid vinyl chloride polymer such as vinyl chloride homopolymers and interpolymers of vinyl chloride with interpolymerizable monomers such as vinyl esters of organic acids containing 1 to 18 carbon atoms, e.g., vinyl acetate, vinyl stearate, and so forth; vinylidene chloride; symmetrical dichloroethylene; acrylonitrile; methacrylonitrile; alkyl acrylate esters in which the alkyl group contains 1 to 8 carbon atoms, e.g., methyl acrylate and butyl acrylate; the corresponding alkyl methacrylate esters; dialkyl esters of dibasic organic acids in which the alkyl groups contain 1 to 8 carbon atoms, e.g., dibutyl fumarate, diethyl maleate, and so forth. In general, where vinyl chloride interpolymers are employed, they should contain at least about 80 weight percent of vinyl chloride.

The ethylene-vinyl alkanoate copolymers contemplated by the invention are those copolymers containing from about 2 to 65 percent by weight of the vinyl alkanoate component. The vinyl alkanoate can be defined by the general formula $$R\ COOCH=CH_2$$

wherein R designates a linear or branch-chained alkyl radical preferably containing from 1 to about 20 carbon atoms. Exemplary of these vinyl alkanoates are: vinyl formate, vinyl acetate, vinyl propionate, vinyl butyrate, vinyl octanoate, vinyl decanoate, vinyl stearate, and the like. Further, the invention contemplates ethylene-vinyl alkanoate copolymers of widely varying molecular weight, as for example, those copolymers having a molecular weight corresponding to a melt index in the range of from about 1 to about 500. Good results, however, are obtained using copolymers of higher or lower molecular weights.

As hereinbefore described, the ethylene-vinyl alkanoate copolymers are advantageously present in the compositions of the invention in amounts of from about 2 to 40 parts by weight per 100 parts of vinyl chloride polymer and preferably from about 3 to 8 parts for obtainment of optimum economy and physical properties. Little improvement in impact strength is generally realized by the use of such ethylene-vinyl alkanoate copolymer in amounts less than about 2 parts by weight based on the weight of the vinyl chloride polymer and amounts in excess of about 40 parts by weight often render such vinyl chloride polymer crumbly and/or soft and gummy and generally unsuitable for applications requiring a rigid or essentially rigid article.

The ethylene-vinyl alkanoate copolymers described herein, and the method of their production are well known to the art. The copolymer resins can be obtained, for example, by the reaction of ethylene with a vinyl alkanoate using the high pressure techniques disclosed in U.S. Patent 2,200,429, or in any other convenient manner.

The chlorinated polyolefins to be used according to the invention are those chlorination products of polymers and copolymers of monoolefins, e.g., ethylene, propylene, butene, isobutylene and mixtures thereof. Especially suitable are the chlorinated products of essentially linear and unbranched polyolefins such as chlorinated polyethylene and chlorinated copolymers of ethylene with butene or propylene, and, more particularly, those essentially non-crystalline chlorinated products of essentially linear and unbranched polyolefins wherein the chlorine substituents are arranged predominantly in a random or uniform manner along the polymer molecule. The process by which the starting polyolefins have ben prepared, and the procedures used for chlorinating the same are, however, not critical to the instant invention. It is only necessary that the chlorinated products are present in the vinyl chloride polymer composition (in combination with the required amounts of the ethylene-vinyl alkanoate copolymer) in amounts sufficient to provide at least about 1 part by weight of chlorinated polyolefin per 100 parts of vinyl chloride polymer and preferably between about 3 and 10 parts by weight per 100 parts of vinyl chloride polymer.

It is to be emphasized, however, that the amounts of chlorinated polyolefins employed may vary depending upon the chlorianted products used and the properties desired. In this regard, the utilization of up to about 20 parts, per 100 parts of vinyl chloride polymer, of a product obtained by chlorinating essentially linear and unbranched polymers of non-aromatic hydrocarbon monoolefins of from 2 to 4 carbon atoms in aqueous suspension, to a total chlorine content of between about 10 and 75 percent, while maintaining such polyolefin in an essentially non-crystalline form, provides significantly enhanced impact strength without significantly affecting the rigidity of the polymeric composition. Amounts of these chlorinated products in excess of about 20 parts by weight, however, often alter the processability of such polymer composition to the extent that undesirable irregularities are often obtained on the surfaces of articles fabricated therefrom.

Various techniques for chlorinating polyolefins are known in the art. Exemplary of such prior known procedures are those disclosed in the U.S. Patents 3,022,276, 3,035,038, 3,071,569, 3,110,709 and the British Patents 828,938 and 882,524, among others.

The vinyl chloride polymer compositions of the invention may be formulated and prepared in any conventional manner as by dry blending the polymeric ingredients and milling them at elevated temperatures of between about 150 and 200° C. with conventionally employed compounding and milling rolls and the like apparatus. Such compositions are particularly useful for the provision of molten or extruded articles or otherwise shaped or fabricated articles of the rigid, chemically resistant type such as pipes and tubing, blown bottles and the like.

It is further to be pointed out that other ingredients such as pigments and stabilizers may also be incorporated into the compositions of the present invention. Exemplary of particularly useful stabilizers are the sulfur containing organo tin compoupnds including the alkyl tin mercaptides as well as dibutyl tin laurate and dibutyl tin maleate among many others known in the art. Such stabilizers are preferably used in amounts sufficient to provide between about 1 and 3 parts by weight per 100 parts of the vinyl chloride polymer constituent of the present invention.

The following examples wherein all parts and percentages are to be taken by weight, illustrate the present invention but are not to be construed as limiting its scope.

EXAMPLE 1

In each of a series of experiments the following specified ingredients were separately admixed in a Waring blender, then fluxed on a laboratory two-roll mill at a temperature of about 188° C. for a period of about 10 minutes to form individual homogeneous sheet materials. Strips were cut from the milled sheets and thereafter compression molded at 188° C. to obtain specimens measuring 5⅜ inches x 3¼ inches x ⅛ inch for use in Izod impact strength tests (ASTM Method D-256).

Ingredient: Parts by weight
  Polyvinyl chloride (having an absolute viscosity in 2 percent o-dichlorobenzene solution at 120° C. of 1.90 to 2.05 cps.) _____ 100
  A polymeric organo tin mercaptide _____ 3
  Mineral oil _____ 0.5
  Ethylene-vinyl acetate copolymer (containing about 35 percent by weight vinyl acetate and having a melt index of between about 30 and 115) _____ 5–10
  Chlorinated polyethylene (CPE) (a chlorinated product having about 35 percent by weight of chemically combined chlorine, a relative crystallinity of less than about 10 percent, a tensile strength of about 1400 p.s.i., and a 100 percent modulus of about 200 p.s.i.) _____ 0–5

The above-described chlorinated polyethylene was obtained by the chlorination in aqueous suspension of a polyethylene having an essentially linear and unbranched molecular structure and an average molecular weight of about 67,000, wherein the charge was first chlorinated under about 30 p.s.i. (gauge) of chlorine gas pressure at a temperature of about 90° C. until a chlorine content of about 18 percent was obtained and then chlorinated to completion at a temperature of about 126° C.

The following Table I illustrates the amounts of ethylene-vinyl acetate copolymer and chlorinated polyethylene used and the Izod impact strength of the polymeric compositions.

Table 1

| Run No. | Composition | | | Izod Impact Strength (ft.-lbs./inch notch) |
|---|---|---|---|---|
| | Ethylene-Vinyl Acetate Copolymer | | CPE (Pts. by Wt.) | |
| | Pts. by Wt. | Melt Index | | |
| For Comparison: | | | | |
| 1 | 10 | 30±3 | | 1.6 |
| 2 | 10 | 100±15 | | 2.1 |
| 3 | | | 10 | 1.2 |
| This Invention: | | | | |
| 4 | 5 | 30±3 | 5 | 15.9 |
| 5 | 5 | 100±15 | 5 | 12.8 |

EXAMPLE 2

In a manner similar to that described in Example 1, a series of experiments were conducted to determine the impact strength of the described polyvinyl chloride compositions containing as the ethylene-vinyl acetate constituent varying amounts of an ethylene-vinyl acetate copolymer containing about 15 percent by weight of vinyl acetate and having a melt index of about 4. All test samples were prepared essentially as described in Example 1 utilizing a mill temperature of about 188° C. and a molding temperature of about 188° C.

The following Table 2 illustrates the amounts of ethylene-vinyl acetate copolymer and chlorinated polyethylene used, and the synergistic effect of utilization of a mixture of the above on the impact strength of the test samples prepared from the polymeric composition.

Table 2

| Run No. | Composition (Pts. by Wt.) | | Impact Strength (Ft.-lbs./inch notch) |
|---|---|---|---|
| | Ethylene-Vinyl Acetate Copolymer | CPE | |
| For Comparison: | | | |
| 6 | 5.0 | | 0.75 |
| 7 | 10.0 | | 0.58 |
| 8 | | 10 | 1.2 |
| 9 | | 12.5 | 1.6 |
| This Invention: | | | |
| 10 | 5.0 | 6 | 16.4 |
| 11 | 7.5 | 3 | 16.8 |
| 12 | 7.5 | 6 | 18.1 |

It can be seen from the data illustrated in Examples 1 and 2 that the impact strength of the rigid polyvinyl chloride compositions of the present invention is outstandingly superior to the impact strength of those polymeric compositions containing only an ethylene-vinyl acetate copolymer or a chlorinated polyethylene.

Similar good results are obtained utilizing compositions comprising an intimate mixture of (1) A vinyl chloride polymer containing at least about 80 weight percent of polymerized vinyl chloride in the polymer molecule with the remainder being at least one monoethylenically unsaturated comonomer (as hereinbefore defined), (2) Between about 2 and 40 parts by weight per 100 parts of vinyl chloride polymer of an ethylene-vinyl alkanoate copolymer containing from about 2 to 65 percent by weight of the vinyl alkanoate component, as defined herein, and (3) Between about 1 and 20 parts by weight per 100 parts of vinyl chloride polymer of a chlorinated polyolefin.

What is claimed is:

1. A homogeneous, vinyl chloride polymer composition comprising a vinyl chloride polymer and, blended therewith, from about 3 to 8 parts by weight per 100 parts of said vinyl chloride polymer of an ethylene-vinyl alkanoate copolymer containing from about 2 to 65 percent by weight of the vinyl alkanoate component and from about 3 to 10 parts by weight per 100 parts of said vinyl chloride polymer of a chlorinated polyolefin.

2. The homogeneous mixture of claim 1 wherein said vinyl chloride polymer is polyvinyl chloride.

3. The homoogeneous mixture of claim 1 wherein said vinyl alkanoate component is vinyl acetate.

4. The homogeneous mixture of claim 1 wherein said chlorinated polyolefin is the product obtained by chlorinating an essentially linear and unbranched polyolefin of a non-aromatic hydrocarbon olefin of from 2 to 4 carbon atoms to a combined chlorine content of between about 10 and 75 percent while said polyolefin is maintained in aqueous suspension in a substantially noncrystalline form.

5. The composition of claim 4 wherein said chlorinated polyolefin is polyethylene containing about 35 weight percent of chemically combined chlorine.

6. A process for preparing a rigid, readily processable, vinyl chloride polymer composition comprising forming an intimate fusion blend of a vinyl chloride polymer; from about 3 to 8 parts by weight per 100 parts of said vinyl chloride polymer of an ethylene-vinyl alkanoate copolymer containing from about 2 to 65 percent by weight of the vinyl alkanoate component; and from about 3 to 10 parts by weight per 100 parts of said vinyl chloride polymer of a chlorinated polyolefin.

7. The process of claim 6 wherein said vinyl chloride polymer is polyvinyl chloride.

8. The process of claim 6 wherein said vinyl alkanoate components is vinyl acetate.

9. The process of claim 6 wherein said chlorinated polyolefin is the product obtained by chlorinating an essentially linear and unbranched polyolefin of a non-aromatic hydrocarbon olefin of from 2 to 4 carbon atoms to a combined chlorine content between about 10 and 75 percent while said polyolefin is maintained in aqueous suspension in a substantially non-crystalline form.

10. The process of claim 9 wherein said chlorinated polyolefin is polyethylene containing about 35 weight percent of chemically combined chlorine.

References Cited by the Examiner

UNITED STATES PATENTS 3,006,889 10/1961 Frey _____ 260—897
3,125,545 3/1964 Van Cleve et al. _____ 260—897

MURRAY TILLMAN, *Primary Examiner.*

SAMUEL H. BLECH, E. B. WOODRUFF,
*Assistant Examiners.*